United States Patent
Lo et al.

(10) Patent No.: US 7,547,361 B2
(45) Date of Patent: Jun. 16, 2009

(54) METHOD AND APPARATUS FOR FABRICATION OF POLYMER-COATED FIBERS

(75) Inventors: Jason Sin Hin Lo, Nepean (CA); Raul Santos, Ottawa (CA); Jacob Krueszewski, Ottawa (CA)

(73) Assignee: Her Majesty the Queen in right of Canada, as represented by the Minister of Natural Resources, Ottawa, Ontario (CA)

( * ) Notice: Subject to any disclaimer, the term of this patent is extended or adjusted under 35 U.S.C. 154(b) by 285 days.

(21) Appl. No.: 10/812,943

(22) Filed: Mar. 31, 2004

(65) Prior Publication Data

US 2005/0221085 A1    Oct. 6, 2005

(51) Int. Cl.
 B05C 5/00      (2006.01)
 B05C 13/02     (2006.01)
 B05B 7/06      (2006.01)
 B05B 7/16      (2006.01)

(52) U.S. Cl. ................. 118/325; 118/302; 118/313; 118/67; 118/69

(58) Field of Classification Search ............... 118/325, 118/300, 302, 326, 58, 66–69, 313, 33–37, 118/40; 156/441, 433; 427/172, 175, 177; 8/151.1, 151.2; 68/205 R, 5 D; 425/543–550; 57/58.49, 58.65; 29/419.1
See application file for complete search history.

(56) References Cited

U.S. PATENT DOCUMENTS

| | | | |
|---|---|---|---|
| 3,422,796 A | | 1/1969 | Babar |
| 4,117,582 A | * | 10/1978 | Borelly ............... 29/419.1 |
| 4,312,917 A | | 1/1982 | Hawley |
| 4,439,387 A | | 3/1984 | Hawley |
| 4,456,495 A | | 6/1984 | Doellinger et al. |
| 4,559,262 A | | 12/1985 | Cogswell et al. |
| 4,664,971 A | | 5/1987 | Soens |

(Continued)

FOREIGN PATENT DOCUMENTS

CA    2018550    12/1990

(Continued)

OTHER PUBLICATIONS

English Translated Abstract DE 3538014A, no date.*

(Continued)

*Primary Examiner*—Yewebdar T Tadesse
(74) *Attorney, Agent, or Firm*—Shapiro Cohen

(57) ABSTRACT

The present invention discloses the fabrication of polymer-coated, coated fiber composites, hybrid composites and a method and apparatus for fabricating the same. The invention provides for the maximum spraying and coating of a roving of coated fibers with molten polymer streams without making physical contact with a solid media, thus simultaneously preventing the fiber surface from getting damaged and stripping off the coating. When metal-coated fiber is used the invention improves the electromagnetic shielding properties of any subsequent product made from the inventive composite. The method and apparatus of the present invention uses sets of nozzle-type sprayers having multiple orifices to enable the thermoplastic or thermoset polymer to penetrate more efficiently into the fiber bundle, thereby providing a more uniform coverage of all fibers. The hybrid composites can consist of two or more types of reinforcements and one or more type of matrix polymer.

3 Claims, 5 Drawing Sheets

U.S. PATENT DOCUMENTS

| | | | |
|---|---|---|---|
| 4,720,366 A | 1/1988 | Binnersley et al. | |
| 4,728,387 A | 3/1988 | Hilakos | |
| 4,738,757 A | 4/1988 | Naarmann | |
| 4,864,964 A | 9/1989 | Hilakos | |
| 4,883,625 A | 11/1989 | Glemet et al. | |
| 4,937,028 A | 6/1990 | Glemet et al. | |
| 5,019,450 A | 5/1991 | Cogswell et al. | |
| 5,091,255 A | 2/1992 | Hsu et al. | |
| 5,401,154 A | 3/1995 | Sargent | |
| 5,447,793 A * | 9/1995 | Montsinger | 428/373 |
| 5,468,327 A | 11/1995 | Pawlowicz et al. | |
| 5,525,423 A * | 6/1996 | Liberman et al. | 428/370 |
| 5,525,558 A | 6/1996 | Niwa et al. | |
| 5,529,652 A | 6/1996 | Asai et al. | |
| 5,607,531 A | 3/1997 | Needham et al. | |
| 5,798,068 A | 8/1998 | Vlug | |
| 5,972,503 A | 10/1999 | Woodside | |
| 6,251,206 B1 | 6/2001 | Saito et al. | |
| 6,270,851 B1 | 8/2001 | Lee et al. | |
| 6,513,234 B2 | 2/2003 | Wilemon et al. | |
| 6,517,654 B1 | 2/2003 | Heckel et al. | |
| 2002/0052440 A1 | 5/2002 | Tochioka et al. | |
| 2002/0180095 A1 | 12/2002 | Berard | |

FOREIGN PATENT DOCUMENTS

| | | |
|---|---|---|
| DE | 3538014 A * | 6/1987 |
| EP | 0 397 506 | 11/1990 |
| JP | 51043446 A * | 4/1976 |
| JP | 63-301598 | 12/1988 |
| JP | 03-272830 | 12/1991 |
| JP | 06-087122 | 3/1994 |
| JP | 06-207029 | 7/1994 |
| JP | 07-144325 | 6/1995 |
| WO | WO 02/02686 | 1/2002 |
| WO | WO 03/022026 | 3/2003 |

OTHER PUBLICATIONS

English Translated Abstract JP 51043446A, no date.*
B. Tang, Fiber Reinforced Polymer Composites Applications in USA, Published in the First Korea/U.S.A. Road Workshop Proceedings, Jan. 28-29, 1997, USA.

* cited by examiner

METHOD AND APPARATUS FOR FABRICATION OF POLYMER-COATED FIBERS

FIELD OF THE INVENTION

This invention relates generally to reinforced polymer composites and a method of, and apparatus for, manufacturing such composites. The invention pertains particularly to polymer-coated fibers. The method and apparatus of the present invention relates particularly to the infiltration of molten polymer inside and around a coated fiber roving.

BACKGROUND OF THE INVENTION

It is known in the art to impregnate fiber structures with polymer. The prior art is replete with many published processes for the fabrication of reinforced fiber structures, and the impregnation of the fibers to coat them with polymer. Because the fiber roving or strand consists of hundreds and thousands of fine fibers of micron or sub-micron diameter, the major challenge for these processes is to ensure that the fibers are properly wetted by the polymer during fabrication so that air bubbles are not trapped in the composite. Improper wetting or infiltration of polymer into the fiber roving causes air bubbles to be trapped which can be retained in the fiber reinforced polymer composite. Consequently, the composite properties are seriously compromised. For example, subsequent use of such a fiber reinforced polymer composite as a feedstock for injection molding of a polymer composite product results in the expansion of the air bubbles retained in the composite during processing. This causes many voids to form in the product. Thus, a fiber reinforced product with inferior or unacceptable properties is formed.

Processes aimed at obtaining a well-coated, resin-coated fiber bundle have included processes which employ cylindrical pins or lobes along with fiber tension to spread apart the filaments and promote resin impregnation of the fiber bundle in a molten resin die. U.S. Pat. No. 4,439,387 to Hawley discloses a method of producing fiber composite material by using such a process. Hawley discloses a method of manufacturing a composite reinforcing structure by extruding a mass of fluid thermoplastic resin material in a flowable state in a stationary die while introducing a plurality of continuous lengths of reinforcing fiber strands into the die in the presence of the flowing mass to contact and coat each fiber strand. The process disclosed in Hawley is characterized by some degree of intermixing of thermoplastic material and the rovings are introduced into the coating channel almost on a perpendicular position, which places rupturing forces onto the roving fibers.

Another process enhances the impregnation of the fibers by alternating convex and concave pins in a molten resin bath or a die. U.S. Pat. No. 4,728,387 to Hilakos describes an assembly for the impregnation of a continuous length of fibers including a sequence of convex and non-convex surfaces over which the length of fibers is drawn under tension. A complete and homogeneous impregnation is obtained via the pressure of impingement on the surfaces which alternately separates and consolidates the fibers in sequence during their impregnation with the resin. Disadvantageously however, the impingement increases the probability of damaging the fibers as the spreading of the fibers is done through the use of mating surfaces touching the fibers. However, in this process there is the risk that a coated fiber will have its coating damaged.

U.S. Pat. No. 6,251,206 to Saito et al., discloses a method for spreading and resin-impregnation to produce continuous fiber-reinforced thermoplastic resin composite material. A reinforcing fiber bundle is spread by passing the fiber bundle through opening pins in a zigzag arrangement and simultaneously impregnating them with molten resin, which permeates into the spaces between the spread-out fibers. This process uses a fixed-type pin with an auxiliary pin and impregnation is effected via an impregnation box through which an impregnation resin flows while retaining a predetermined amount of the molten resin inside the box. The use of an impregnation box would not allow to spray the resin and is not as efficient as a rotating nozzle.

U.S. Pat. No. 5,091,255 to Hsu et al. discloses elongated granules of reinforcing fibers that extend generally parallel to each other and are longitudinally dispersed uniformly throughout a latex binder composition. The method of manufacturing such granules as disclosed in Hsu includes the steps of continuously passing reinforcing fibers through one or more baths of an aqueous, film-forming latex binder composition, to impregnate the filaments.

U.S. published patent application No. 2002/0180095 to Berard discloses the extrusion of a thermally conductive polymer composition containing a continuous core of carbon fiber reinforcement created in a machine configured to hold a spool containing a continuous strand of carbon fiber core material. In Berard's method, there is physical contact of the fibers with a solid surface during the coating process, as the carbon fiber strand is unrolled off the spool and is fed into a preheating chamber and then fed into a port in an extruding head on a pressure extruding machine. A molten polymer matrix is also fed into the extruding head thereby extruding the polymer matrix onto, around and between the individual carbon fibers contained in the strand.

U.S. Pat. No. 6,270,851 Lee et al. discloses an apparatus for preparing a resin coated fiber composite providing a narrow flow path for the fiber filaments in a zigzag shaped tunnel, and a plurality of resin inlet ports disposed along the tunnel to fill molten resin in the zigzag shaped tunnel, and pressurize the flow path of the fiber filamentous. Lee et al. provides a continuously tensioning of the fiber filaments and contacts between the fiber and the semicircular rings and so does not facilitate limited physical contact between the fibers and the solid surface during the coating process so as to lessen the rupturing stresses along the rovings.

U.S. Pat. No. 4,559,262 to Cogswell et al. discloses a fiber-reinforcing structure with exceptionally high stiffness is produced by wetting the reinforcing filaments with molten thermoplastic polymer in a continuous process separating the rovings into the individual constituent fibers by applying electrostatic charges to the rovings, prior to their entry into the molten thermoplastic polymer, or spreading the roving by passing it under tension over the outside of heated spreader surfaces while in the bulk of the impregnation bath. Such tension may cause damage to the structural integrity of the stretched fiber and especially to the coating of a coated fiber.

Conventionally, all of the fabrication processes try to overcome the bubble entrapment problem by physically pressing the fiber roving against a concave surface in order to spread the fibers while allowing molten polymer to infiltrate between the fibers. However, the major drawback with this solution is that most fibers are forced to rub against a static solid surface in order to spread the roving. This action will unavoidably cause at least some physical damage to the fibers. Moreover, in the case where the fibers are coated, this process is very likely to strip off a significant proportion of the coating from the fiber surface. Fibers whose coating has been stripped in this manner are poor candidates for certain applications of the final composite material such as electromagnetic interference shielding.

In view of the foregoing, there is a demand for a means of fabricating polymer-coated, metal-coated fiber materials without causing the metal-coated fibers to keep physical contact with a solid surface. In addition, there is a demand for a method of, and an apparatus for, producing continuous polymer-coated, metal-coated fibers wherein frictional forces (which might cause mechanical damage to the fibers or the stripping off of a coating, if present) between the fibers and solid surfaces is eliminated. There is also a demand for a means of fabricating polymer-coated fibers (especially for fibers with a coating) wherein the fibers do not have physical contact with the sprayer solid surface while being sprayed with polymer.

SUMMARY OF THE INVENTION

The present invention provides a method for the fabrication of a continuous polymer-coated fiber composite. The present invention provides in particular, a new continuous process for coating metal-coated fibers with a molten polymer matrix, wherein there is no physical contact between the fibers and the surface of the nozzle sprayer, to produce polymer-coated, metal-coated fibers. While the process of the present invention of applying polymer onto a fiber is suitable for all coated fibers, for electromagnetic interference shielding purpose, it is preferred that the coating on the fiber be a metal. The metal-coated fibers may include carbon fibers coated with nickel or any coating suitable for the given use. Other metals suitable for electromagnetic interference shielding which may be used include nickel alloys, silver, silver alloys, aluminum, aluminum alloy, copper, copper alloy, monel metal, monel metal alloys, tin or tin alloys.

When aluminum, magnesium and copper alloys are used as electromagnetic interference shielding, the fibers are coated by the metal of choice with the chemical vapor deposition (CVD), physical vapor deposition (PVD), electrochemical, or chemical processes.

The method and apparatus of the present invention uses a nozzle-type sprayer to enable the polymer plastic coating to penetrate more efficiently into the fiber roving thereby to provide a more uniform coverage of all fibers without damage to the fiber or any coating on a coated fiber. The present invention avoids damage to the fiber that could result in reduced strength properties. Further, the present invention avoids coating damage on, for example, metal-coated fibers. In such instances, this greatly improves electromagnetic shielding properties of a reinforced composite fabricated from the polymer-coated, metal-coated fiber formed by the present invention due to the improved integrity of the metal coating in the composite.

The invention provides for polymer-coated fiber composite fabricated by providing a roving of metal-coated fiber that is spread apart by a multiple stream of molten polymer. Suitable polymers that may be used include thermoplastics and thermosets. As the roving passes through the streams of molten polymer, the fibers are sprayed such that a cross-section of the roving curves into a hemispherical shape by the force of the molten polymer. No physical contact other than with the molten polymer occurs. Molten polymer is ejected from sets of special nozzles housed in a heated chamber and consisting of a few lines of fine holes or orifices in a tube. The series of fine holes are drilled on a tube in order to control the fiber spray profile or homogeneity. The size of the fine holes and the spacing between the holes is varied to achieve maximum spreading of the roving. Due to the arrangement of the nozzles and the orifices contained therein, the molten polymer spray will eject towards both the top surface and bottom surface of the horizontally oriented roving. Because the spraying of the roving is achieved by the molten polymer streams, conventional prior art physical spreading effected by contact with solid surfaces is obviated.

For purposes of discussion, there is at least one set of nozzle. The number of nozzle tubes is not fixed and it is dependent on how thorough a wetting is required, how many types of polymers are required and how much polymer is required to deposit onto the fiber. In addition, a second or more nozzles can be used for ejecting a different polymer for providing a second or multi-layer coatings. In a preferred embodiment, the nozzles arc adapted to rotate.

The apparatus and the manufacturing method and composite material of the present invention provide a polymer-coated fiber for use in molding applications that overcomes the limitations of the prior art by providing an inexpensive method for creating polymer-coated fiber material that comprises a consistent distribution of polymer coated and metal-coated carbon fibers. The present invention therefore also provides for an injection molding material that has high uniformity, and high integrity of the metal coating which can be used to produce a molded structure.

In one aspect of the invention, the present invention seeks to provide a method of producing polymer-coated fibers comprising combining a continuous roving of coated fibers with a molten polymer by means of a heating chamber adapted to house at least one nozzle including a plurality of orifices located in a row for ejection of the molten polymer upon and by which the coated fibers are spread; and cooling the molten polymer upon the continuous roving of coated fibers by means of a cooling chamber to form a contiguous polymer-coated fiber.

In a second aspect, the present invention seeks to provide a method of producing polymer-coated, metal-coated fibers, the method comprising combining a continuous roving of metal-coated fibers with a molten polymer stream by means of a heating chamber adapted to house at least one nozzle including a plurality of orifices located in a row for ejection of the molten polymer upon and by which the fibers of the continuous roving of metal-coated fibers are spread via only force of the molten polymer stream and with minimal damage of the fibers of the continuous roving of metal-coated fibers; cooling the molten polymer upon the individual fibers of the continuous roving of fibers by means of a cooling chamber to form a contiguous polymer-coated, metal-coated fiber; and recovering the polymer-coated, metal-coated fibers.

In a third aspect, the present invention seeks to provide an apparatus for producing polymer-coated, metal-coated fibers the apparatus comprising a reel means for providing movement of a roving of metal-coated fibers; at least one nozzle including a plurality of orifices for spreading each metal-coated fiber of the roving without making contact with each metal-coated fiber of the roving and spraying a molten polymer stream upon the roving; a heating chamber for housing the sprayer nozzles; and a cooling chamber for cooling the molten polymer on the roving; wherein the molten polymer stream is ejected from each one of the orifices of the sprayer nozzles in a manner sufficient to forcibly spread the metal-coated fibers without removal of metal-coating therefrom, and the molten polymer is cooled on the roving by the cooling chamber to form a contiguous polymer-coated, metal-coated fibers.

In a fourth aspect, the present invention seeks to provide a polymer-coated, metal-coated fiber composite comprising a plurality of metal-coated fibers interspersed within an encasement of polymer wherein the metal-coating of the metal-coated fibers is substantially undamaged.

The present invention also provides a method for producing pelletized injection molding feedstock having reinforcing fibers therein. Another aspect of the present invention is the provision of low cost method for producing injection-molding pellets or short segments of polymer coated fibers.

DETAILED DESCRIPTION OF THE INVENTION

The present invention provides an apparatus comprising: a bobbin from which a roving of fabric is drawn, at least one set including at least one nozzle housed in a heated chamber, each containing at least one line of holes and from each of which a stream of molten polymer is sprayed, a cooling chamber wherein an inert gas is blown over the coated fibers for cooling and solidifying the molten polymer, a set of fiber pick-up wheels which draws the roving from the bobbin and past the nozzle, through the cooling chamber and through an exit nozzle; a strand alignment device which aligns the strands of polymer coated fiber, and a set of cutting blades of various geometry, preferably cutting wheels which cut the polymer coated fiber into short segments or pellets. Alternatively, the polymer-coated fiber can be simply wound in a length for use later as short (e.g., 1 cm) pellets or in any given length (e.g., 1 m lengths that might be used to fabricate a mat-like composite product).

In the absence of a cooling chamber, the polymer coated composite fiber strand may be air-cooled as it exits the heated chamber through the exit nozzle. Thus, the exit nozzle may serve the purpose of cooling the molten polymer and controlling the diameter of the polymer coated composite fiber strand.

Typically, the inert gas which is blown over the coated fibers for cooling and solidifying the molten polymer may be selected from nitrogen, helium and argon.

Figure 1:
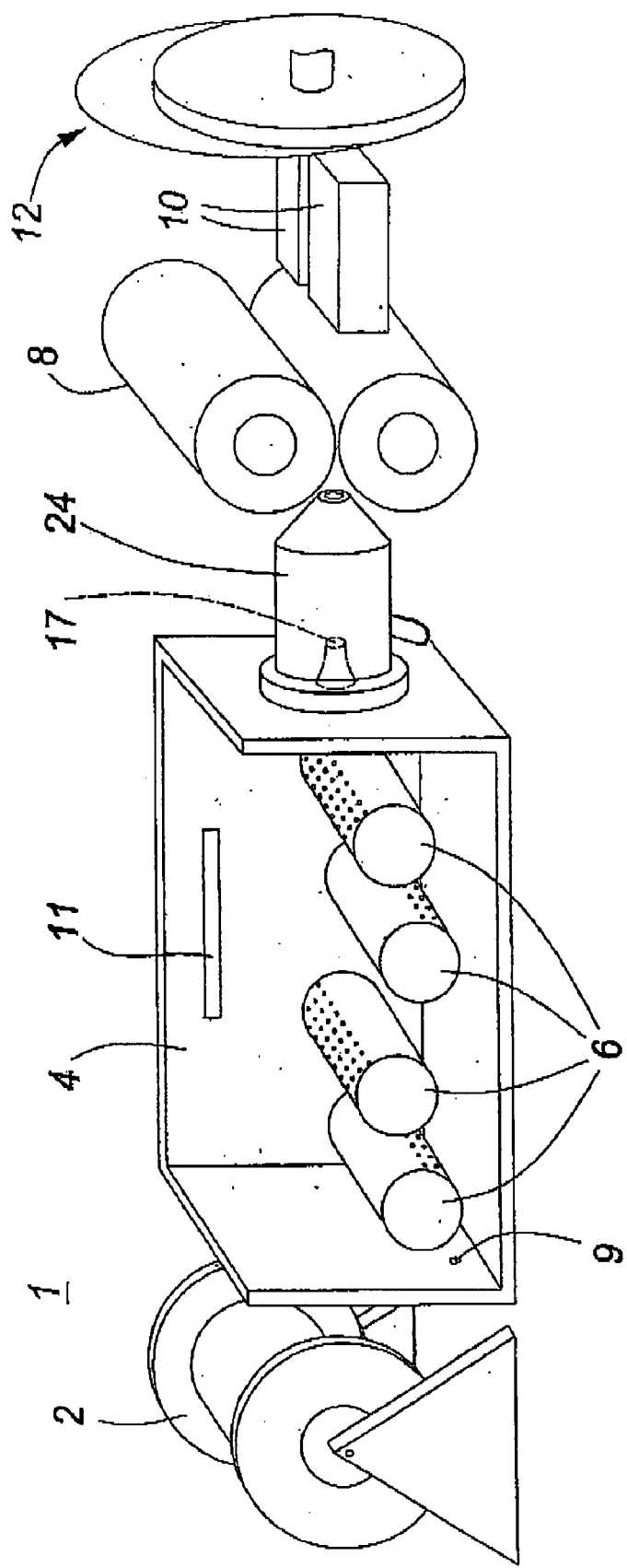
FIG. 1 is a diagrammatic representation of an embodiment of an apparatus to carry out the process of the invention in a stationary state before the fabrication operation.
Figure 2A:
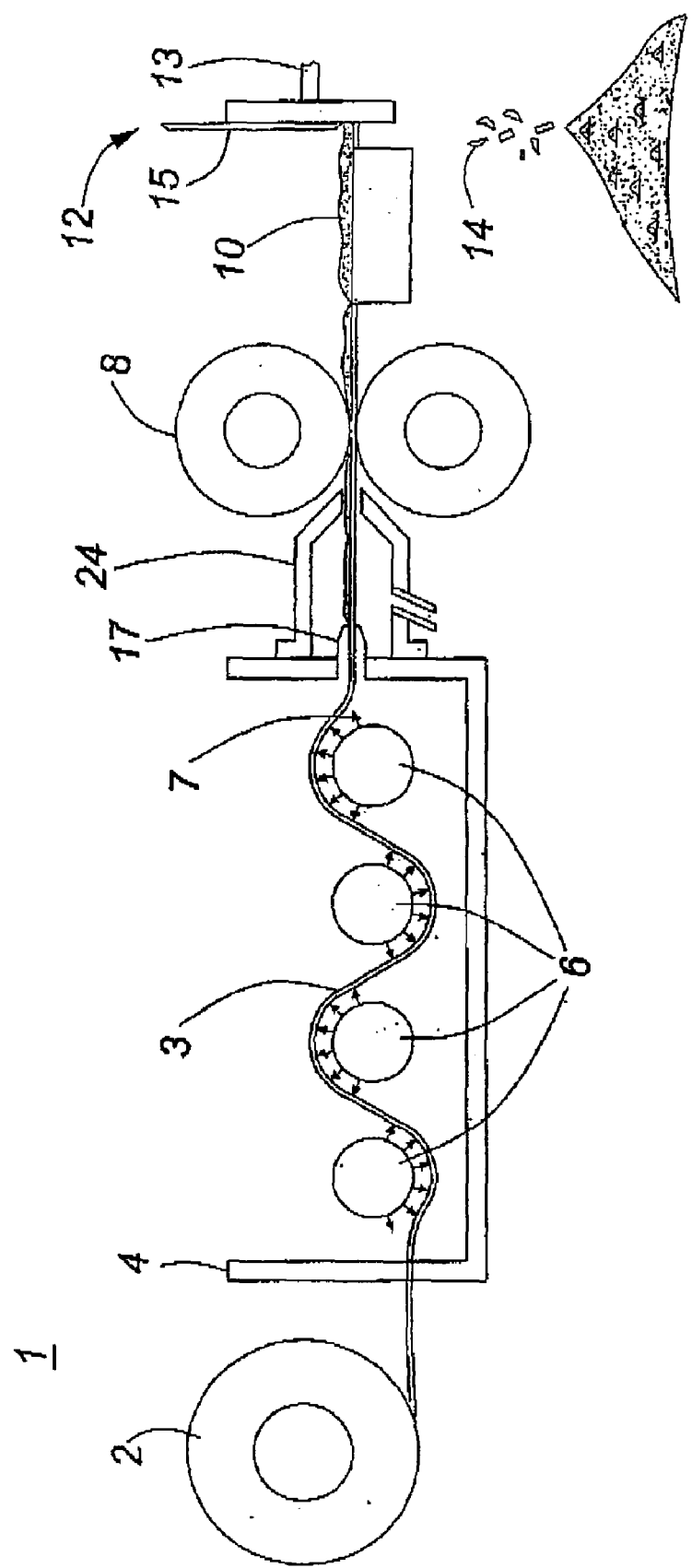
FIGS. 2a and 2b are diagrammatic representations of an embodiment of an apparatus to carry out the process of this invention during the fabrication and coating operation.
Figure 2B:
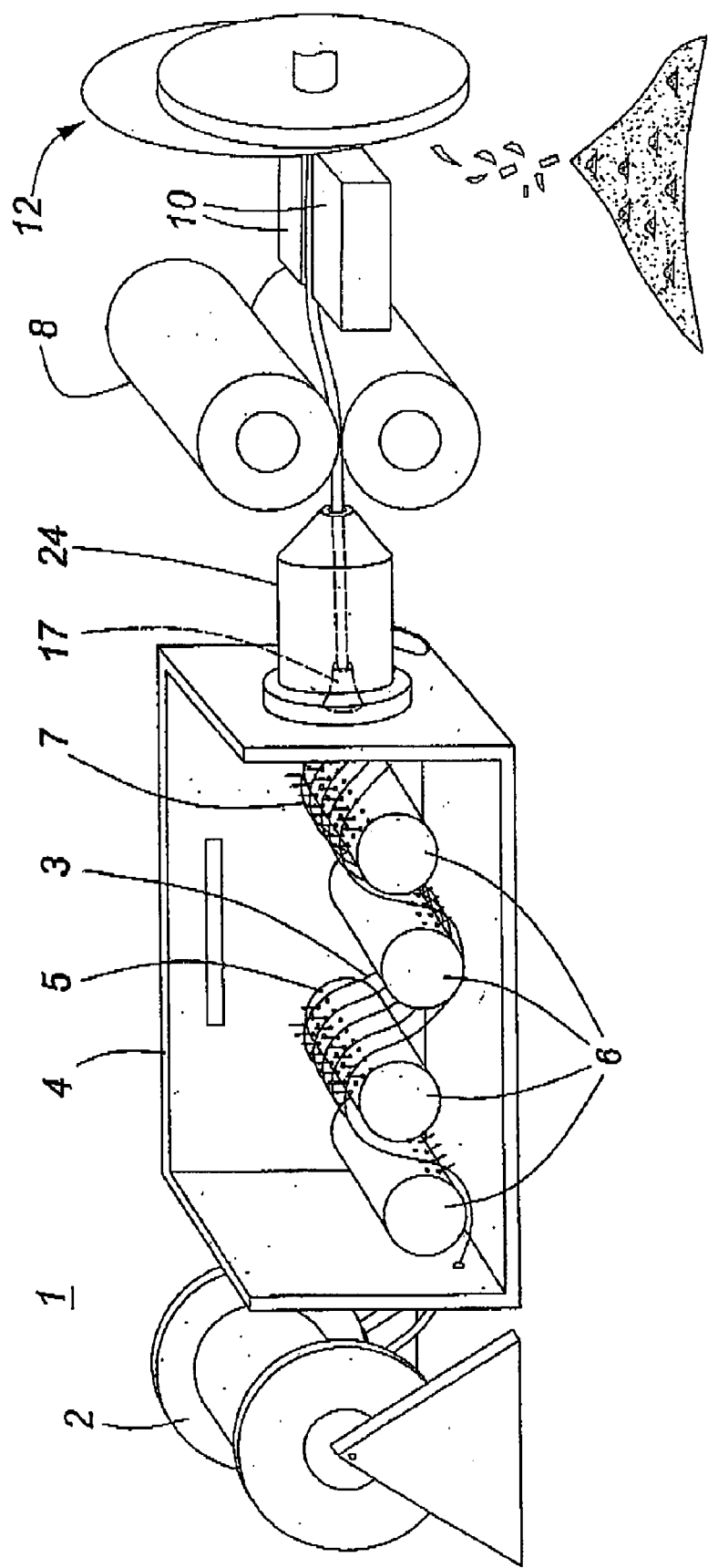

As shown in FIGS. 1 and 2, the present invention includes an apparatus 1 that provides a means of (i) coating a roving of fibers 3 without using physical contact with a solid media; (ii) wetting the individual fibers by molten polymers 7; and cutting the as-fabricated polymer coated fiber into short segments or pellets 14.

Figure 5:
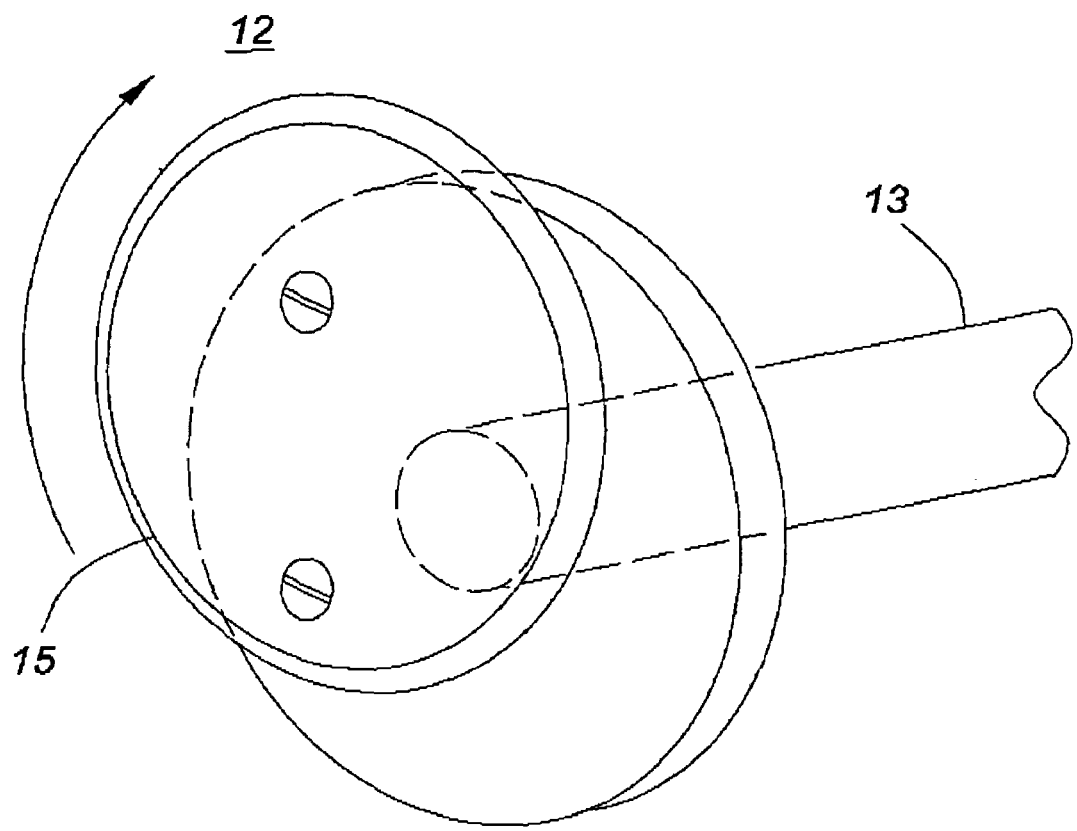
FIG. 5 is a diagrammatic representation of the cutting wheels.

In FIG. 1, a roving of fiber (not shown) is arranged to be drawn from a bobbin 2, through an orifice 9, and passes through four sets of nozzles 6 housed in a heated chamber 4 which includes a controllable heating device 11. The heating device 11 is situated on the roof of the heated chamber and is effective in preventing the polymer from cooling prematurely prior to its being extruded. The nozzles 6 are connected to a pressurized reservoir (not shown) of molten polymer. A cooling chamber 24, whereby an inert gas is blown onto the coated fibers serves to solidify the molten polymer onto the fibers as it exits the heated chamber through the exit nozzle 17. A set of fiber pick-up wheels 8 draws the roving from the bobbin and through the above-mentioned two chambers and through the exit nozzle 17. A strand alignment device 10 aligns the strands of polymer-coated fiber as it is extruded from the exit nozzle and through the fiber pick up wheels and eventually to a set of cutting wheels 12 where the reinforced fiber composites are cut into short segments or pellets 14 (FIG. 2). As shown in FIG. 5, the cutting wheel 12 comprises a shaft 13 which holds the cutting wheel, and a cutting wheel blade 15.

At the set-up stage, the roving is in physical contact with the surfaces of the special nozzles 6. When coating begins as shown in FIG. 2, molten polymer 7 is ejected onto the roving 3 and causes (i) the roving to be lifted from the nozzles 6; (ii) the fibers in the roving to spread in a parabolic fashion; and (iii) to cause fine turbulent streams of molten polymer 7 to infiltrate into the roving and thereby wet individual fibers.

Figure 3:
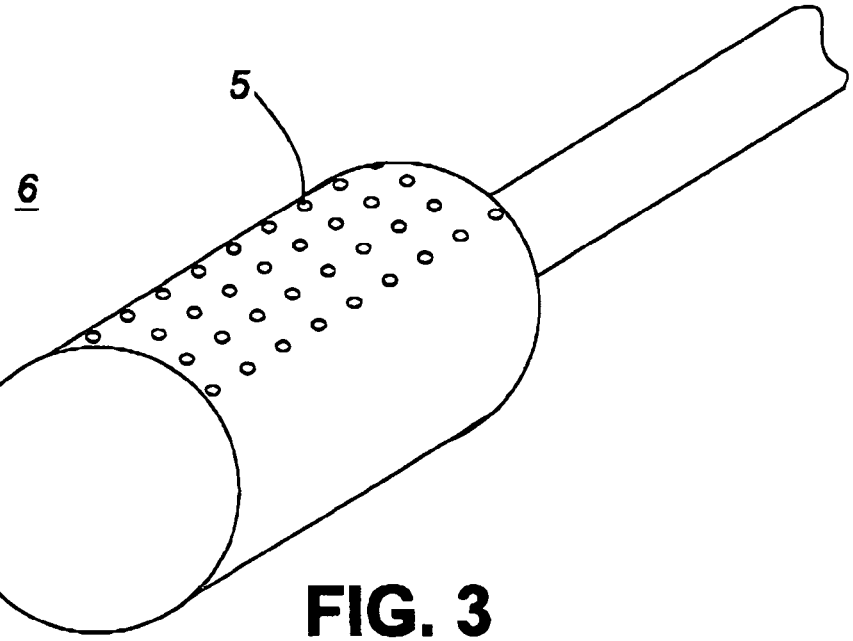
FIG. 3 is a diagrammatic representation of the special tube nozzle, of the apparatus of FIG. 1.
Figure 4:
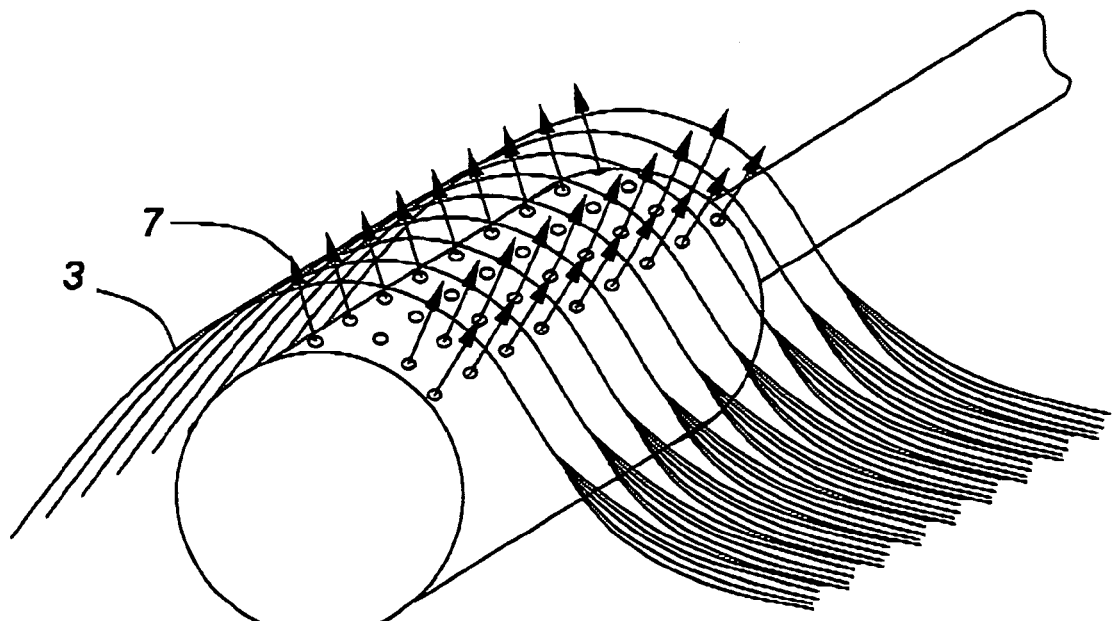
FIG. 4 is the roving dispersion and spraying process while the roving is passing through the special nozzles.

The nozzle 6 as shown in FIG. 3 consists of a straight tube containing rows of tiny holes or orifices 5 that act as the orifices for molten polymer streams. The path of the polymer stream is shown by reference character 7 in FIGS. 2 and 7. The arrangement and the size of these holes are each designed in such a manner to cause maximum spraying of the fibers by the molten polymer streams 7, and individually coat the fibers without the sprayer nozzle 6 coming into direct physical contact with the fibers 3. Thus, advantageously, the method and apparatus of the present invention prevents any rubbing action between fibers and solid surfaces that could result in (i) damaging the fiber surface and (ii) stripping off the coating of the surface of the fibers that may be coated.

In a nozzle tube, it is preferred to have at least 3 rows of orifices spaced to cover at least 45° angle of spread. Also, the size of orifice in a nozzle tube is preferably small to allow more effective infiltration of polymer into the fiber roving, preferably no more than 0.35 mm.

When the coating process begins, the following steps are taken:

a. The temperature of the heated chamber is brought to at least about 30° C. above the melting temperature of the polymer for coating the fibers. Ideally, the temperature of the heated chamber is controlled and selected to match the temperature at which the molten polymer will flow.

b. The pressure is adjusted to cause streams of molten polymer to eject from the rows of orifices in the nozzles, and spray onto the fibers.

c. Inert gas is turned on in the cooling chamber to solidify the newly formed fiber reinforced polymer composite, which should be solid enough for the pick-up wheels to grab hold of, without damaging the composite.

d. The fiber pick-up wheels are turned on, so that fibers are drawn from the bobbin and caused to go through the coating line.

e. The cutting blades are turned on so that the as-fabricated composite fibers are chopped into short segments.

f. The short segments are collected in a suitable hopper.

In the event that the surface of the metallic coated fiber needs to be functionalized by a first polymer (A) prior to covering of the fibers by the matrix polymer (B), arrangements can be made such that the first nozzle tube will eject first polymer (A), while at least one sequence nozzles tube will eject second polymer (B).

In the case that two types of polymers are spread onto the fibers, the nozzle tubes have to be connected to a separate pressurized reservoir. This can be taken care of by connecting the nozzles to individual micro-extruders, rather than using multiple injection molding machines.

It is possible that, instead of using a molten polymer on its own, a molten polymer already reinforced with fine particulates can be fed from the nozzle to wet the fibers, such that the eventual polymer composite would contain both particulate and fiber reinforcement to form a hybrid composite. Considering the fine orifice-size (<0.35 mm) in the nozzle, the particulates have to be much finer, in the micron and sub-micron size range. The functions of the particulate reinforcement are to act as a spacer to disperse the fibers by preventing clustering of fibers or to provide additional functional properties to the composite (such as wear resistance or enhancing the thermal properties). The particulate can be chosen from a ceramic particulate such as silicon carbide, alumina, aluminum nitride, silicon dioxide, carbon, etc.; or can be a metallic particulate such as nickel, silver, monel, tin, copper, aluminum, steels, chromium, etc.

To further enhance the functional property of the composite, it is also possible to feed molten polymer reinforced with nano-particles or nano-clay through the nozzle to the fibers to form a hybrid composite with both fiber and nano-particles. Again, the material for the nano-particle can be chosen from silicon carbide, alumina, aluminum nitride, silicon dioxide, carbon, etc.; or from metallic particulates such as nickel, silver, monel, tin, copper, aluminum, steels, chromium, etc.

Having thus described the invention, what is claimed as new and secured by Letters Patent is:

1. An apparatus for producing polymer-coated, metal-coated fibers said apparatus comprising:

a reel means for providing movement of a roving of metal-coated fibers;

at least one sprayer nozzle including a plurality of orifices for spreading each metal-coated fiber of the roving without making contact with each metal-coated fiber of the roving and spraying a molten polymer stream upon the roving;

a heating chamber for housing each of the at least one sprayer nozzle; and a cooling chamber for cooling the molten polymer on the roving;

wherein the molten polymer stream is ejected from each one of the orifices of the each of the at least one sprayer nozzle in a manner sufficient to forcibly spread the metal-coated fibers without removal of metal-coating therefrom, and the molten polymer is cooled on the roving by the cooling chamber to form a contiguous polymer-coated, metal-coated fibers.

2. The apparatus of claim 1 further comprising a cutting means for rendering pellets from the contiguous metal-coated fiber and polymer composite.

3. The apparatus of claim 1 wherein the reel means includes a bobbin on which the roving is wound and a set of fiber pick-up wheels in contact with the bobbin.

* * * * *